United States Patent
Li et al.

(10) Patent No.: US 10,761,993 B2
(45) Date of Patent: Sep. 1, 2020

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Xiongcheng Li, Beijing (CN); Changyu Feng, Beijing (CN); Yousheng Liu, Beijing (CN); Ruiyong Jia, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/225,808

(22) Filed: Dec. 19, 2018

(65) Prior Publication Data
US 2019/0332542 A1 Oct. 31, 2019

(30) Foreign Application Priority Data
Apr. 28, 2018 (CN) .......................... 2018 1 0398870

(51) Int. Cl.
*G06F 12/08* (2016.01)
*G06F 12/0888* (2016.01)
*G06F 12/0882* (2016.01)
*G06F 12/0804* (2016.01)
*G06F 12/0873* (2016.01)
(Continued)

(52) U.S. Cl.
CPC .......... *G06F 12/0888* (2013.01); *G06F 3/061* (2013.01); *G06F 3/0659* (2013.01); *G06F 3/0664* (2013.01); *G06F 3/0679* (2013.01); *G06F 11/073* (2013.01); *G06F 12/0804* (2013.01); *G06F 12/0873* (2013.01); *G06F 12/0882* (2013.01); *G06F 2201/81* (2013.01); *G06F 2201/88* (2013.01); *G06F 2212/1016* (2013.01)

(58) Field of Classification Search
None
See application file for complete search history.

(56) References Cited

U.S. PATENT DOCUMENTS

| 6,834,325 B1 * | 12/2004 | Milillo ................ G06F 12/0866 709/219 |
| 7,596,791 B2 | 9/2009 | Wei et al. |
| 9,229,870 B1 | 1/2016 | Kumar et al. |
| | | (Continued) |

*Primary Examiner* — Kevin Verbrugge
(74) *Attorney, Agent, or Firm* — BainwoodHuang

(57) ABSTRACT

Various techniques manage a storage system. Such techniques involve, in response to receiving an Input/Output (I/O) request for a first slice of a logic storage unit in a storage system, obtaining a first bitmap with respect to the logic storage unit, the logic storage unit being divided into a plurality of slices including the first slice, and one bit in the first bitmap indicating whether a cache function is enabled for a respective one of the plurality of slices. The techniques further involve determining, based on the first bitmap, whether the cache function is enabled for the first slice. Moreover, the techniques further involve, in response to determining that the cache function is enabled for the first slice, processing the I/O request at least with a cache in the storage system. Such techniques can control the use of cache in the storage system in a finer granularity.

20 Claims, 7 Drawing Sheets

(51) Int. Cl.
*G06F 3/06* (2006.01)
*G06F 11/07* (2006.01)

(56) References Cited

U.S. PATENT DOCUMENTS

| | | |
|---|---|---|
| 9,426,246 B2 | 8/2016 | Wan et al. |
| 9,645,932 B1 | 5/2017 | Bono et al. |
| 9,720,596 B1 | 8/2017 | Bono et al. |
| 9,773,026 B1* | 9/2017 | Tetreault ................. G06F 11/30 |
| 9,965,201 B1 | 5/2018 | Bono et al. |
| 10,114,829 B1 | 10/2018 | Bono et al. |
| 10,635,332 B2 | 4/2020 | Wu et al. |
| 2014/0281273 A1* | 9/2014 | Kalekar .............. G06F 12/0833 |
| | | 711/144 |

* cited by examiner

METHOD, DEVICE AND COMPUTER PROGRAM PRODUCT FOR MANAGING STORAGE SYSTEM

FIELD

Embodiments of the present disclosure generally relate to the field of data storage, and more specifically, to method, device and computer program product for managing a storage system.

BACKGROUND

A storage resource pool composed of a large amount of storage disks usually exists in a storage system. Physical logic storage units can be created on the storage resource pool. The physical logic storage units refer to logic storage units that are directly mapped to a physical storage space and the number of the physical logic storage units is usually restricted by the size of the actual available physical storage space. Besides, virtual logic storage units can be created based on the physical logic storage units for use by an upper-layer application. The virtual logic storage units are not restricted by the size of the physical storage space. A system administrator can create a large amount of virtual logic storage units, but space allocation is actually performed only when data is to be written. Therefore, the virtual logic storage units can easily implement different tiers to store various data to meet different user requirements.

A cache component usually also exists in the storage system and improves performance of data access by transparently storing the frequently accessed data in a faster storage medium (e.g., flash) relative to underlying storage disks. However, the cache is usually enabled and disabled based on the entire storage resource pool. In other words, in a plurality of virtual logic storage units based on the same storage resource pool, the cache function cannot be enabled for some more important virtual logic storage units and disabled for other less important virtual logic storage units.

SUMMARY

Embodiments of the present disclosure provide method, device and computer program product for managing a storage system.

In a first aspect of the present disclosure, there is provided a method for managing a storage system. The method includes, in response to receiving an Input/Output (I/O) request for a first slice of a logic storage unit in a storage system, obtaining a first bitmap with respect to the logic storage unit, the logic storage unit being divided into a plurality of slices including the first slice, and one bit in the first bitmap indicating whether a cache function is enabled for a respective one of the plurality of slices. The method also includes determining, based on the first bitmap, whether the cache function is enabled for the first slice. Moreover, the method further includes, in response to determining that the cache function is enabled for the first slice, processing the I/O request at least with a cache in the storage system.

In a second aspect of the present disclosure, there is provided a device for managing a storage system. The device includes at least one processing unit and at least one memory coupled to the at least one processing unit and storing instructions for execution by the at least one processing unit. The instructions, when executed by the at least one processing unit, cause the device to perform actions including: in response to receiving an Input/Output (I/O) request for a first slice of a logic storage unit in a storage system, obtaining a first bitmap with respect to the logic storage unit, the logic storage unit being divided into a plurality of slices including the first slice, and one bit in the first bitmap indicating whether a cache function is enabled for a respective one of the plurality of slices; determining, based on the first bitmap, whether the cache function is enabled for the first slice; and in response to determining that the cache function is enabled for the first slice, processing the I/O request at least with a cache in the storage system.

In a third aspect of the present disclosure, there is provided a computer program product. The computer program product is tangibly stored in a non-transient computer storage medium and includes machine executable instructions. The machine executable instructions, when executed by a device, cause the device to perform any steps of the method described according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

Throughout the drawings, the same or corresponding reference symbols are used to indicate the same or corresponding parts.

DETAILED DESCRIPTION OF EMBODIMENTS

Figure 1:
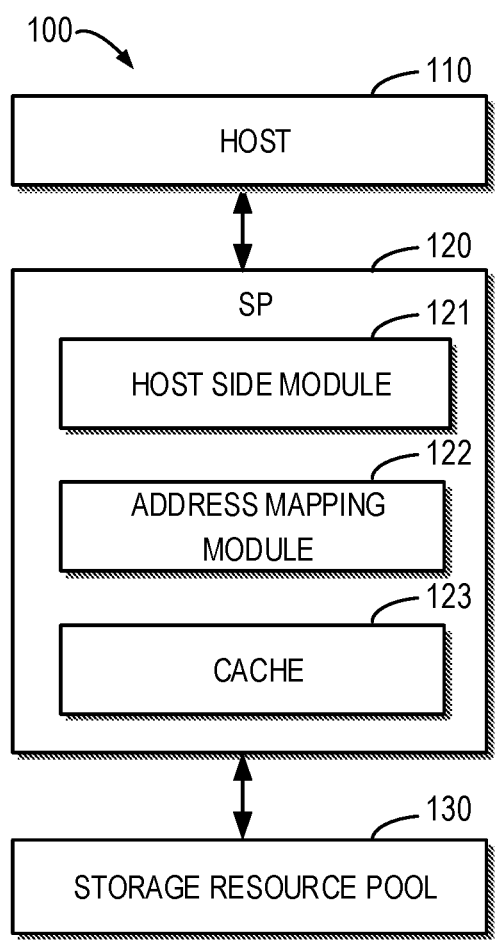
FIG. 1 illustrates a block diagram of an example storage system where some embodiments of the present disclosure can be implemented.

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described above, a storage resource pool composed of a large amount of storage disks usually exists in a storage system. Different storage units, such as physical logic storage unit and virtual logic storage unit and the like, can be created on the storage resource pool.

The physical logic storage unit refers to logic storage units that are directly mapped to physical storage spaces and the number of the physical logic storage units usually is restricted by the size of the actual available physical storage space. The virtual logic storage units can be created based on the physical logic storage units for use by an upper-layer application. The virtual logic storage units are not restricted by the size of the physical storage space. A system administrator can create a large amount of virtual logic storage units, but space allocation is actually performed only when data is to be written. Therefore, the virtual logic storage units can easily implement different tiers to store various data to meet different user requirements.

A cache in the storage system improves performance of data access by transparently storing the frequently accessed data in a faster storage medium (e.g., flash) relative to underlying storage disks. However, in a traditional solution, the cache is usually enabled and disabled based on the entire storage resource pool. In other words, in a plurality of virtual logic storage units based on the same storage resource pool, the cache function cannot be enabled for some more important virtual logic storage units and disabled for other less important virtual logic storage units.

Moreover, in a case where the cache function is enabled, when some virtual logic storage units are disabled, it have to take a relatively long time for the data cached in the cache for the disabled virtual storage units to be released (e.g., the data will not be released until heat of corresponding cache pages drops below a predetermined threshold), since the cache cannot be informed of information about the disabled virtual storage units.

Example embodiments of the present disclosure provide a solution for managing a storage system to solve one or more of the above problems and other potential problems. This solution enables the user to control the use of the cache based on applications that directly employ the virtual logic storage units, so as to control the use of the cache in a finer granularity and in a more flexible way. When one physical logic storage unit is disabled in the storage resource pool, only a virtual logic storage unit created based on the physical logic storage unit is marked as unavailable. Besides, when some virtual logic storage units are disabled, data cached in the cache for the disabled virtual storage units can be released more rapidly.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

FIG. 1 illustrates a block diagram of an example storage system 100 where embodiments of the present disclosure can be implemented. As shown in FIG. 1, a storage system 100 includes a host 110, a Storage Processor (SP) 120 and a storage disk 130. It should be understood that structure and function of the storage system 100 are described only for the purpose of examples, without suggesting any limitations to the scope of the present disclosure. As will be further described below, embodiments of the present disclosure also can be applied to storage systems having different structures and/or functions.

In some embodiments, the host 110, for example, can be any physical computer, virtual machine and server that operate user applications and the like. The host 110 can transmit to the SP 120 an Input/Output (I/O) request, e.g., to read or write data etc. The storage resource pool 130 can be composed of a large amount of storage disks, each of which can be any non-volatile storage medium currently known or to be developed in the future, such as magnetic disk, Solid-State Disk (SSD) or disk array and the like. Different storage units, such as physical logic storage units, virtual logic storage units and the like, can be created on the storage resource pool 130. In the following text, "storage resource pool" and "storage disks" can be used interchangeably.

The "physical logic storage units" here refer to logic storage units that are directly mapped to a physical storage space and the number of the physical logic storage units usually is restricted by the size of the actual available physical storage space. The "virtual logic storage units" here can be created based on the physical logic storage units for use by an upper-layer application. The virtual logic storage units are not restricted by the size of the physical storage space. A system administrator can create a large amount of virtual logic storage units, but space allocation is actually performed only when the data is to be written. Therefore, the virtual logic storage unit can easily implement different tiers to store various data to meet different user requirements.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Figure 2:
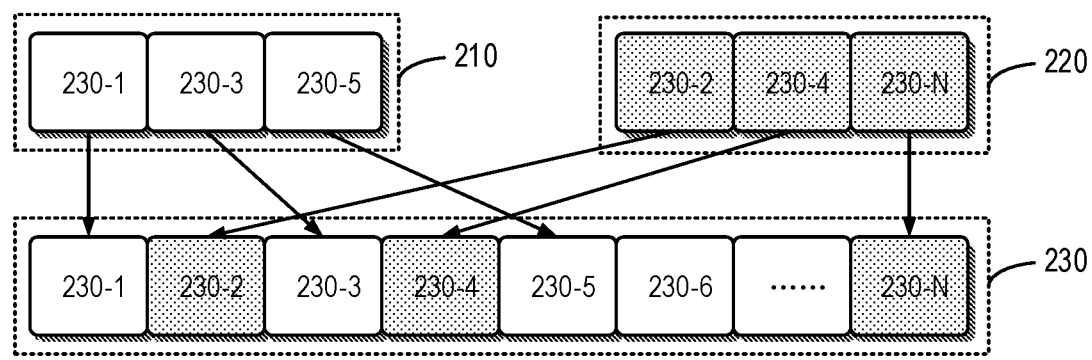
FIG. 2 illustrates a schematic diagram of different logic storage units created in the storage system according to embodiments of the present disclosure.

FIG. 2 illustrates a schematic diagram of different logic storage units created in the example storage system 100 according to embodiments of the present disclosure. FIG. 2 illustrates a physical logic storage unit 230 created based on the storage resource pool 130 and virtual logic storage units 210 and 220 created based on the physical logic storage unit 230. As shown in FIG. 2, the physical logic storage unit 230 can be divided into a plurality of slices 230-1, 230-2, . . . , 230-N (individually referred to as slice 230 or collectively referred to as slices 230 in the text). The virtual logic storage units 210 and 220 can be created based on some of the slices 230. For example, the virtual logic storage unit 210 can be allocated with slices 230-1, 230-3 and 230-5 while the virtual logic storage unit 220 can be allocated with slices 230-2, 230-4 and 230-N.

Although FIG. 2 only illustrates one physical logic storage unit 230 and two virtual logic storage units 210 and 220, it should be understood that this is only for the purpose of illustration and is not intended for limiting the scope of the present disclosure. In some embodiments of the present disclosure, a plurality of physical logic storage units can be created based on the storage resource pool 130. A large amount of virtual logic storage units can be created based on the created plurality of physical logic storage units. Besides, the same logic storage unit can be created based on different physical logic storage units. When on physical logic storage unit is disabled in the storage resource pool 130, virtual logic storage units created based on the physical logic storage unit can be disabled.

Furthermore, space allocation of a virtual logic storage unit can be performed in different ways. In some embodiments, a virtual logic storage unit can be allocated with a fixed number of slices, for example. That is, the size of the virtual logic storage unit will not change during use. In some further embodiments, a virtual logic storage unit can be created dynamically. In other words, the number of slices allocated to the virtual logic storage unit can vary as the requirement change. It should be understood that the virtual storage unit 210 or 220 shown in FIG. 2 can be created in any of the above ways, and the scope of the present disclosure is not limited in this regard.

The physical logic storage unit and the virtual logic storage unit usually have different address spaces. For example, an I/O request transmitted from the host 110 to the SP 120 shown in FIG. 1 may indicate a Logic Block Address (LBA) with respect to the virtual logic storage unit to be accessed. When processing the I/O request, the SP 120 needs to convert the address with respect to the virtual logic storage unit into a logic block address with respect to a corresponding physical logic storage unit, so as to implement access to a corresponding physical storage space.

As shown in FIG. 1, the SP 120 may generally include a host side module 121, an address mapping module 122 and a cache 123. It should be understood that the SP 120 also can include other components than the above components in some embodiments, and the scope of the present disclosure is not limited in this regard.

The host side module 121 may receive from the host 110 the I/O request and forward the I/O request to the address mapping module 122. The host side module 121 also can return an I/O acknowledgement to the host 110 according to a processing result of the I/O request. The address mapping module 122 can convert the LBA with respect to the virtual logic storage unit to be accessed indicated in the I/O request into an LBA with respect to a corresponding physical logic storage unit, and transmit the I/O request to the cache 123 after the address conversion. The cache 123 can temporarily store the frequently accessed data in a faster storage medium (e.g., flash) relative to underlying storage disks, to improve performance of data access. For example, if the I/O request is a read request, the cache 123 can directly return data to be read in case that the data to be read has already been cached in pages of the cache 123 (i.e., "cache hit"). If the I/O request is a write request, the cache 123 can directly write the data to be written into corresponding pages if the data targeted by the write request in the storage unit has already been cached in the pages of the cache 123 (i.e., "cache hit"). The data will be flushed to corresponding storage disks later. If the data targeted by the I/O request in the storage unit has not been cached in the cache 123 yet (i.e., "cache miss"), the I/O request will be forwarded to corresponding storage disks for processing. If data in a storage unit is frequently accessed, the data can be written into a corresponding page of the cache 123 for subsequent access.

In some embodiments, the above cache function provided by the cache 123 can be enabled or disabled based on the slices in the logic storage unit. For example, a bitmap with respect to a physical logic storage unit can be utilized to indicate whether the cache function is enabled for each of physical logic storage unit or not. That is, each physical logic storage unit can have a respective bitmap to indicate whether the cache function is enabled for each of slices in the physical logic storage unit or not. In the text, such bitmap is also known as "first bitmap." In some embodiments, the first bitmap, for example, can be stored in a dedicated logic storage unit specialized for saving the system information created based on a part of physical storage resources in the storage resource pool 113.

When a bit in the first bitmap corresponding to a certain slice is set to enable the cache function, a cache strategy will be applied to data within the slice. That is, when the data within the slice is frequently accessed, the data will be cached in the cache 123 to enhance performance of subsequent access. When a bit in the first bitmap corresponding to a certain slice is set to disable the cache function, the I/O request for the slice will be directly forwarded to the storage disks for processing. Besides, as will be further described below, a background service can operate on the cache 123 to scan the cache pages in the cache 123. If a cache page corresponding to the slice for which the cache function is disabled exists in the cache 123, the cache page will be immediately flushed into the storage disks and the metadata associated with the page will be removed from the cache 123.

In some embodiments, the address mapping module 122 can maintain a mapping between virtual logic storage units and a plurality of slices provided by the physical logic storage units. For example, the address mapping module 122 can record the following information about a virtual logic storage unit: an identifier of the virtual logic storage unit, a start LBA of the virtual logic storage unit, the number of logic blocks in the virtual logic storage unit, the number of slices included in the virtual logic storage unit, identifiers of physical logic units where respective slices included in the virtual logic storage unit are located, and a slice number of each of the slices included in the virtual logic storage unit in the physical logic unit where the slice is located etc.

In some embodiments, the address mapping module 122 can notify, in response to a request from an upper-layer application, the cache 123 of which slices in the physical logic storage unit are enabled for caching and for which slices the cache function is disabled. For example, the address mapping module 122 can transmit a command to the cache 123 which corresponds to the creation of the virtual logic storage unit, to enable or disable the cache function for the virtual logic storage unit.

In some embodiments, the address mapping module 122 can transmit to the cache 123 a command (also referred to as "first command" in the text) to enable the cache function for a slice. For example, the first command may include: an identifier of a virtual logic storage unit associated with the slice, an identifier of a physical logic storage unit where the slice is located, a slice label of the slice in the physical logic storage unit, and an indication for enabling the cache function. In response to receiving the first command from the address mapping module 122, the cache 123 may set a bit in the first bitmap corresponding to the slice, to enable the cache function for the slice.

In some embodiments, the address mapping module 122 can transmit to the cache 123 a command (also referred to as "second command" in the text) to disable the cache function for a slice. For example, the second command may include: an identifier of a virtual logic storage unit associated with the slice, an identifier of a physical logic storage unit where the slice is located, a slice label of the slice in the physical logic storage unit, and an indication for disabling the cache function. In response to receiving the second command from the address mapping module 122, the cache 123 may set a bit in the first bitmap corresponding to the slice, to disable the cache function for the slice.

In some embodiments, the address mapping module 122 can transmit to the cache 123 a command to enable or disable the cache function for a plurality of continuous slices in the physical logic storage unit. For example, the command may include: an identifier of a virtual logic storage unit associated with the plurality of continuous slices, an identifier of a physical logic storage unit where the plurality of continuous slices is located, a slice number of a start one of the plurality of slices in the physical logic storage unit, the number of slices in the plurality of continuous slices, and an indication for enabling or disabling the cache function. In response to receiving the command from the address mapping module 122, the cache 123 may set a bit corresponding to the slice in the bitmap, to enable or disable the cache function for the slice.

Additionally or alternatively, in some embodiments, in addition to the first bitmap, each physical logic storage unit may be associated with a respective bitmap indicating whether cache pages corresponding to the slices of the physical logic storage unit are valid or not. In the text, such bitmap is also referred to as "second bitmap." Similar to the first bitmap, for example, the second bitmap may be stored in a dedicated logic storage unit specialized for saving the system information created based on a part of physical storage resources in the storage resource pool 113. For example, if one bit in the second bitmap is set to "1", it may indicate that data (i.e., one or more cache pages corresponding to the slice) of the slice corresponding to the bit is invalid in the cache 123. When an I/O request hits the cache page that is marked as invalid in the second bitmap, the I/O request will be directly forwarded to the physical logic storage unit, so as to directly read data from the storage disks or write data into the storage disks.

In some embodiments, when a virtual logic storage unit is disabled, the address mapping module 122 may transmit a command to the cache 123 to invalidate cache pages associated with the virtual logic storage unit in the cache 123. For example, the address mapping module 122 may transmit to the cache 123 a command (also referred to as "third command" in the text) to invalidate one or more cache pages corresponding to one slice. For example, the third command may include: an identifier of a virtual logic storage unit associated with the slice, an identifier of a physical logic storage unit where the slice is located, a slice label of the slice in the physical logic storage unit, and an indication for invalidating a cache page corresponding to the slice. In response to receiving the third command from the address mapping module 122, the cache 123 may set a bit corresponding to the slice in the second bitmap, so as to invalidate the cache page corresponding to the slice. For example, when an I/O request hits the cache page corresponding to the slice that is invalidated, the I/O request will be directly forwarded to the physical logic storage unit, to read data from the storage disks or write data into the storage disks directly. In this way, when some virtual logic storage units are disabled, data cached in the cache for the disabled virtual logic storage units can be released more rapidly.

Additionally or alternatively, in some embodiments, in addition to the first and second bitmaps, each physical logic storage unit may also be associated with a respective bitmap indicating whether respective data cached in the cache 123 for the slices of the physical logic storage unit is dirty or clean. In this text, such bitmap is also referred to as "third bitmap." Similar to the first bitmap, for example, the third bitmap may be stored in a dedicated logic storage unit specialized for saving the system information created based on a part of physical storage resources in the storage resource pool 113. "Dirty data" here refers to data that is cached in the cache 123 but has not been flushed into the storage disks yet. "Clean data" here refers to data that is cached in the cache 123 and has already been flushed into the storage disk.

In some embodiments, when data in a slice is written into one or more cache pages in the cache 123 corresponding to the slice for the first time, a bit in the third bitmap corresponding to the slice may need to be set to indicate that data associated with the slice is dirty. Moreover, as will be further described below, a background service can operate on the cache 123 to scan the cache pages in the cache 123. When a page caching dirty data is scanned, the cache 123 can flush the data in the page to the storage disks. When all of the dirty data corresponding to one slice is flushed to the storage disks, the cache 123 can set the bit corresponding to the slice in the third bitmap, to indicate that the data associated with the slice is clean.

Figure 3:
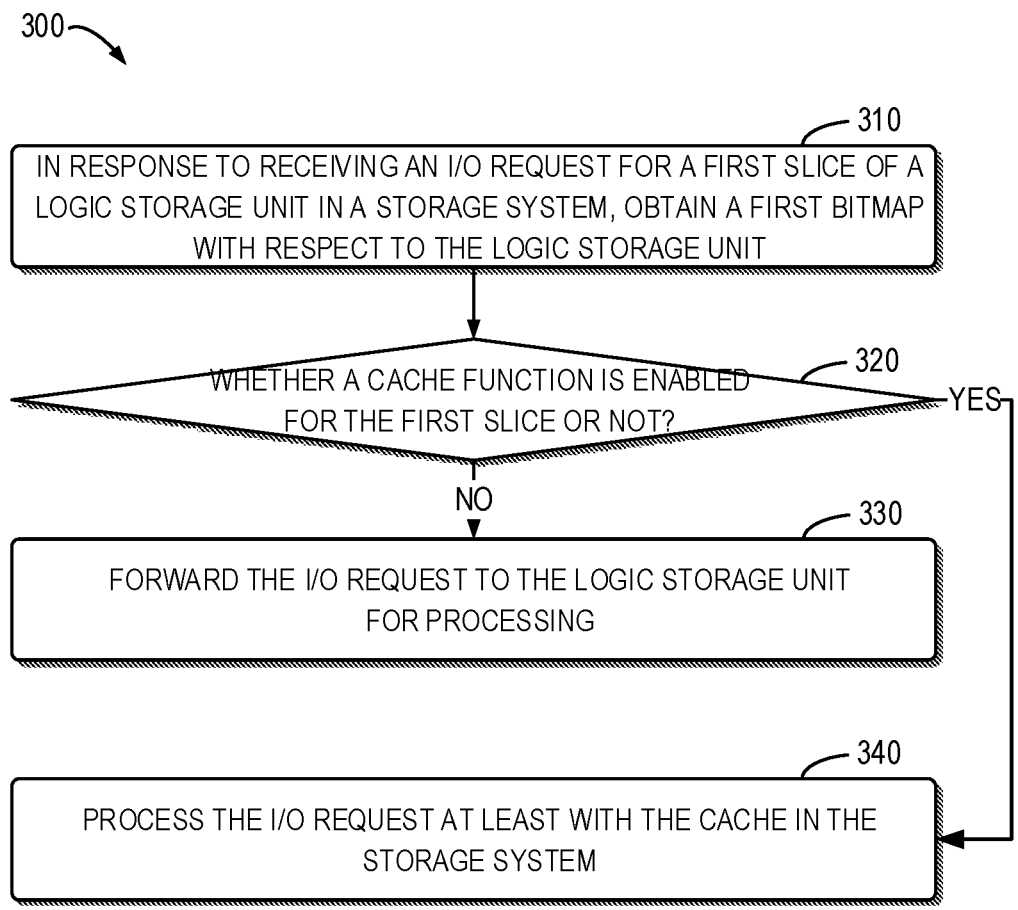
FIG. 3 illustrates a flowchart of a method for managing a storage system according to embodiments of the present disclosure.

FIG. 3 illustrates a flowchart of a method 300 for managing a storage system according to embodiments of the present disclosure. For example, the method 300 can be performed by the SP 120 shown in FIG. 1. Specifically, the method 300 can be performed at the cache 123 in the SP 120 for example. Various actions in the method 300 will be described in details below with reference to FIG. 1. It should be understood that the method 300 can also include additional actions not shown and/or omit some shown actions, and the scope of the present disclosure is not limited in this regard.

At block 310, the cache 123 obtains, in response to receiving an I/O request for a first slice of a logic storage unit (e.g., a physical logic storage unit) in the storage system, a first bitmap with respect to the logic storage unit. Here, it is assumed that the I/O request requests to access the slice 230-2 (also known as "first slice" in the text) in the physical logic storage unit 210 shown in FIG. 2. In some embodiments, the first bitmap, for example, can be stored in a dedicated logic storage unit specialized for saving the system information created based on a part of physical storage resources in the storage resource pool 113. The cache 123 can obtain the first bitmap from the dedicated logic storage unit. In some embodiments, the first bitmap can include a plurality of bits respectively corresponding to a plurality of slices 230 in the physical logic storage unit 210, each of which may indicate whether the cache function is enabled for a respective one of the plurality of slices 230.

At block 320, the cache 123 determines, based on the first bitmap, whether the cache function is enabled for the slice 230-3. If the cache 123 determines that the cache function is disabled for the slice 230-3, at block 330, the cache 123 forwards the I/O request to the physical logic storage unit 210 to directly read data from the storage disks or write data into the storage disks. If the cache 123 determines that the cache function is enabled for the slice 230-3, at block 340, the cache 123 applies the cache function to the slice 230-3 to process the I/O request for the slice 230-3.

Figure 4:
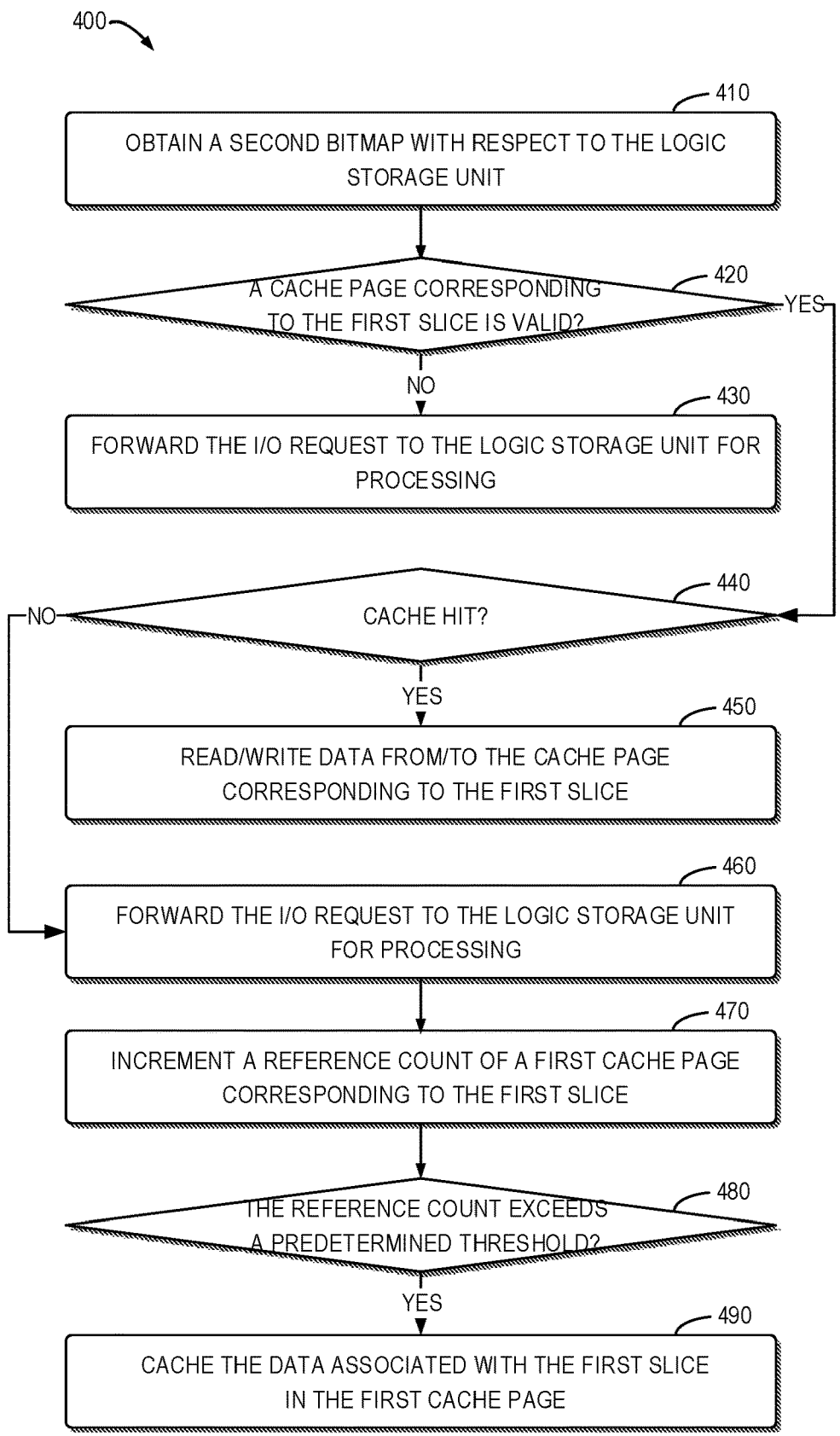
FIG. 4 illustrates a flowchart of a method for processing an I/O request with a cache according to embodiments of the present disclosure.

FIG. 4 illustrates a flowchart of a method 400 for processing an I/O request with the cache according to embodiments of the present disclosure. For example, the method 400 can acts as an example implementation of the block 340 in the method 300. The method 400, for example, can be performed by the SP 120 shown in FIG. 1. Specifically, the method 400 can be performed at the cache 123 in the SP 120 for instance. It should be understood that the method 400 also can include additional actions not shown and/or omit some shown actions, and the scope of the present disclosure is not limited in this regard.

At block 410, the cache 123 obtains a second bitmap with respect to the physical logic storage unit 210. In some embodiments, the second bitmap, for example, can be stored in a dedicated logic storage unit specialized for saving the system information created based on a part of physical storage resources in the storage resource pool 113. The cache 123 can obtain the second bitmap from the dedicated logic storage unit. In some embodiments, the second bitmap can include a plurality of bits respectively corresponding to a plurality of slices 230 in the physical logic storage unit 210, each of which may indicate whether a cache page in the cache 123 corresponding to a respective one of the plurality of slices 230 is valid or not.

At block 420, the cache 123 determines, based on the second bitmap, whether a cache page in the cache 123 corresponding to the slice 230-3 is valid or not.

If the cache 123 determines that the cache page corresponding to the slice 230-3 is invalid in the cache 123, at block 430, the cache 123 forwards the I/O request to the physical logic storage unit 210 to read data from the storage disks or write data into the storage disks directly.

If the cache 123 determines that the cache page corresponding to the slice 230-3 is valid in the cache 123, at block 440, the cache 123 determines whether data of the slice targeted by the I/O request has been cached in the cache page or not (i.e., "cache hit"). In case of cache hit, the cache 123 can read data from the cache page corresponding to the slice 230-3 (also known as "first cache page" in the text) or write the data into the page.

If the cache is not hit, at block 460, the cache 123 forwards the I/O request to the physical logic storage unit 210 to read/write data from/to the storage disks. Besides, at block 470, the cache 123 may increment a reference count for a cache page corresponding to the slice 230-3. In some embodiments, if there is no reference count for the cache page corresponding to the slice 230-3 in the cache 123, the cache 123 may allocate a free cache page reference count to the slice 230-3. For example, the reference count can indicate the frequency in which data associated with the slice 230-3 is accessed. If the reference count for a first cache page corresponding to the slice 230-3 already exists in the cache 123, the cache 123 can increment the reference count for the first cache page.

At block 480, the cache 123 determines whether the reference count for the first cache page exceeds a predetermined threshold. If the reference count does not exceed the predetermined threshold, it demonstrates that the data associated with the slice 230-3 is not frequently accessed. Therefore, the data associated with the first cache page (e.g., data to be read or written by the I/O request for the slice 230-3) may not be cached in the first cache page. If the reference count exceeds the predetermined threshold, it demonstrates that the data associated with the slice 230-3 is frequently accessed. Therefore, the data associated with the first cache page (e.g., data to be read or written by the I/O request for the slice 230-3) can be written into the first cache page for subsequent access and use.

Figure 5:
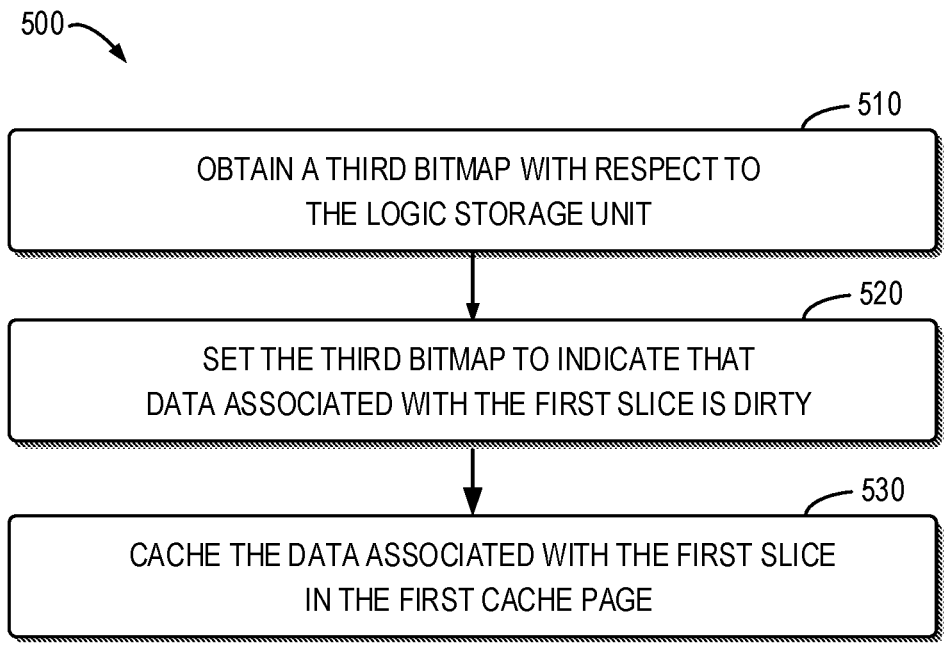
FIG. 5 illustrates a flowchart of a method for writing data into a cache page of a cache according to embodiments of the present disclosure.

FIG. 5 illustrates a flowchart of a method 500 for writing data into a cache page of a cache according to embodiments of the present disclosure. For example, the method 500 can act as an example implementation of the block 490 in the method 400. It should be understood that the method 500 also can include additional actions not shown and/or omit some shown actions, and the scope of the present disclosure is not limited in this regard.

At block 510, the cache 123 obtains a third bitmap with respect to the physical logic storage unit 210. In some embodiments, the third bitmap, for example, can be stored in a dedicated logic storage unit specialized for saving the system information created based on a part of physical storage resources in the storage resource pool 113. The cache 123 can obtain the third bitmap from the dedicated logic storage unit. In some embodiments, the third bitmap can include a plurality of bits respectively corresponding to a plurality of slices 230 in the physical logic storage unit 210, each of which may indicate whether data buffered in the cache 123 for a respective one of the plurality of slices 230 is dirty or not.

At block 520, prior to writing the data associated with the slice 230-3 into the cache 123, the cache 123 can set the third bitmap to indicate that the data associated with the slice 230-3 is dirty.

Then, at block 530, the cache 123 writes the data associated with the slice 230-3 into a first cache page corresponding to the slice 230-3.

As described above, a background process can operate at the cache 123 to scan the cache pages in the cache 123. In response to discovering a cache page corresponding to a slice for which the cache function is disabled, the cache page will be immediately flushed into the storage disks and the metadata associated with the page will be removed from the cache 123. When a page caching dirty data is scanned, the cache 123 can flush the data in the page to the storage disks. When all of the dirty data corresponding to one slice is flushed to the storage disks, the cache 123 can set the bit corresponding to the slice in the third bitmap, to indicate that the data associated with the slice is clean.

Figure 6:
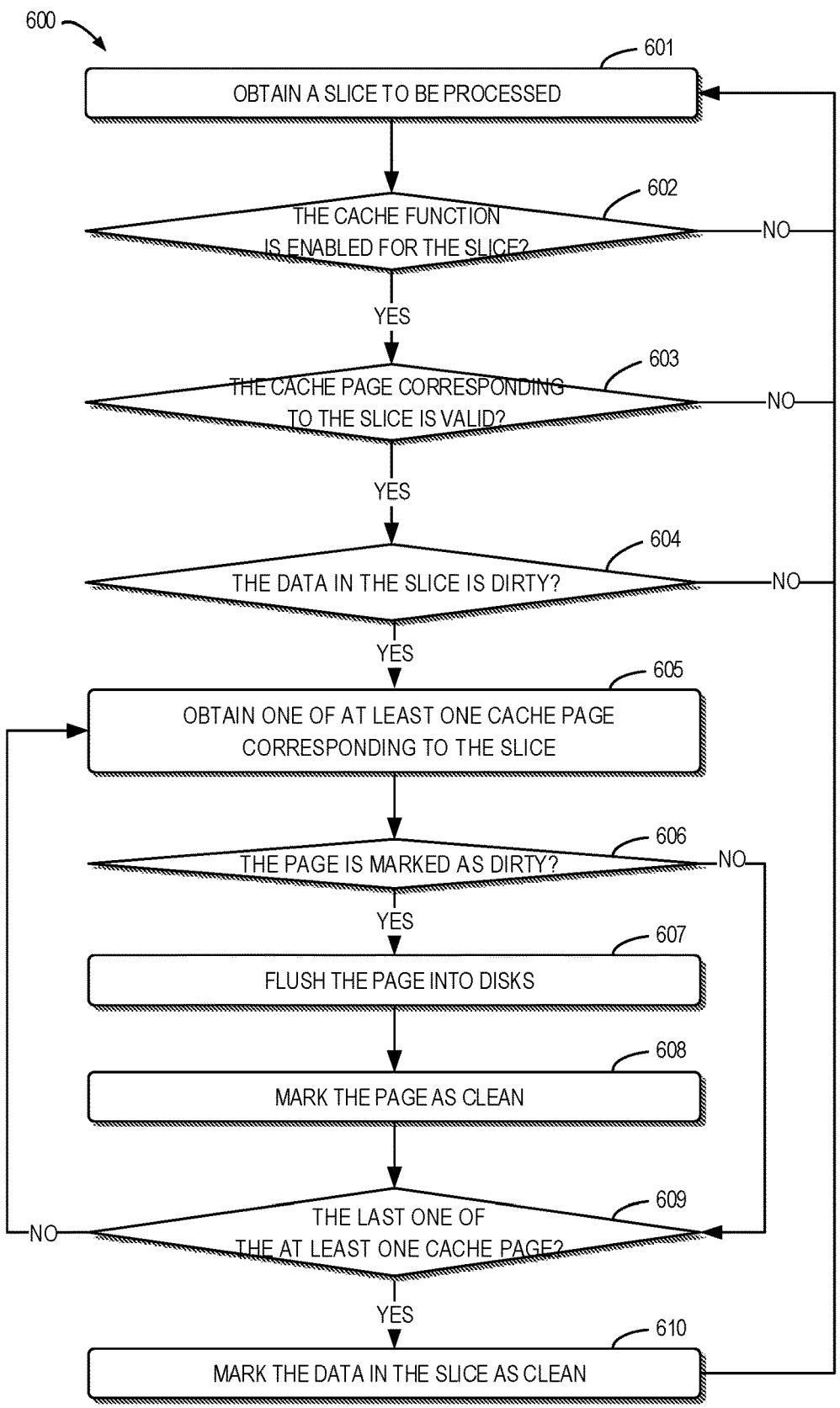
FIG. 6 illustrates a flowchart of a background process operating at the cache according to embodiments of the present disclosure.

FIG. 6 illustrates a flowchart of a process 600 operating at the cache 123 according to embodiments of the present disclosure. In some embodiments, the process 600 can cyclically operate in the background of the cache 123. That is, for example, the cache 123 still can receive and respond to one or more commands (e.g., for enabling or disabling the cache function for slices, or invalidating the cache page and the like) from the address mapping module 122 when the process 600 is allowed. It should be understood that the process 600 also can include additional actions not shown and/or omit some shown actions, and the scope of the present disclosure is not limited in this regard.

At block 601, the cache 123 obtains a slice to be scanned. In some embodiments, the cache 123 can scan slices based on the physical logic units in the storage system, e.g., by scanning each of the slices in each of the physical logic units one by one. In other embodiments, the cache 123 can scan slices based on the virtual logic storage units in the storage system, e.g., by scanning each of the slices in each of the virtual logic units one by one. In some embodiments, in addition to the physical logic units and the virtual logic units, there may be other storage objects created based on slices in the physical logic units in the storage system. In this case, the cache 123 can scan slices based on these storage objects.

At block 602, the cache 123 determines, based on the first bitmap of the physical logic storage unit where the slice is located, whether the cache function is enabled for the slice. If the cache 123 determines that the cache function is disabled for the slice, the process 600 proceeds to block 601, where a next slice to be processed is obtained.

If the cache 123 determines that the cache function is enabled for the slice, at block 603, the cache 123 determines, based on the second bitmap of the physical logic storage unit, whether the cache page corresponding to the slice is valid or not. If the cache 123 determines that the cache page corresponding to the slice is invalid, the process 600 proceeds to block 601, where a next slice to be processed is obtained.

If the cache 123 determines that the cache page corresponding to the slice is valid, at block 604, the cache 123 determines, based on the third bitmap of the physical logic storage unit, whether the data cached in the cache 123 for the slice is dirty or not. If the cache 123 determines that the data cached for the slice is clean, the process 600 proceeds to block 601, where a next slice to be processed is obtained.

If the cache 123 determines that the data associated with the slice is dirty, the cache 123 obtains a page to be processed from one or more pages corresponding to the slice at block 605.

At block 606, the cache 123 determines whether the page is marked as dirty. If the cache 123 determines that the page is dirty, the cache 123 will flush the page into the storage disks at block 607, and mark the page as clean at block 608. "Dirty page" here refers to a cache page in the cache 123 which has not been flushed to the storage disks. "Clean page" here refers to a cache page in the cache 123 which has already been flushed into the storage disks.

If the cache 123 determines that the page is a clean page, the process 600 proceeds to block 609, where the cache 123 determines whether the page is a last page in the one or more pages corresponding to the slice. If not, the process 600 proceeds to block 605 to obtain a next page to be processed.

If dirty pages associated with the slice are all flushed to the storage disks, the process 600 proceeds to block 610, where the cache 123 sets the third bitmap to mark the data associated with the slice as clean. Then, the procedure 600 proceeds to block 601 to obtain a next slice to be processed.

From the above description, it can be seen that the solution for managing a storage device according to example embodiments of the present disclosure enables the user to control the use of the cache based on applications that directly employ the virtual logic storage unit, so as to control the use of the cache in a finer granularity and in a more flexible way. When one physical logic storage unit is disabled in the storage resource pool, only a virtual logic storage unit created based on the physical logic storage unit is marked as unavailable. Besides, when some virtual logic storage units are disabled, data cached in the cache for the disabled virtual storage units can be released more rapidly.

Figure 7:
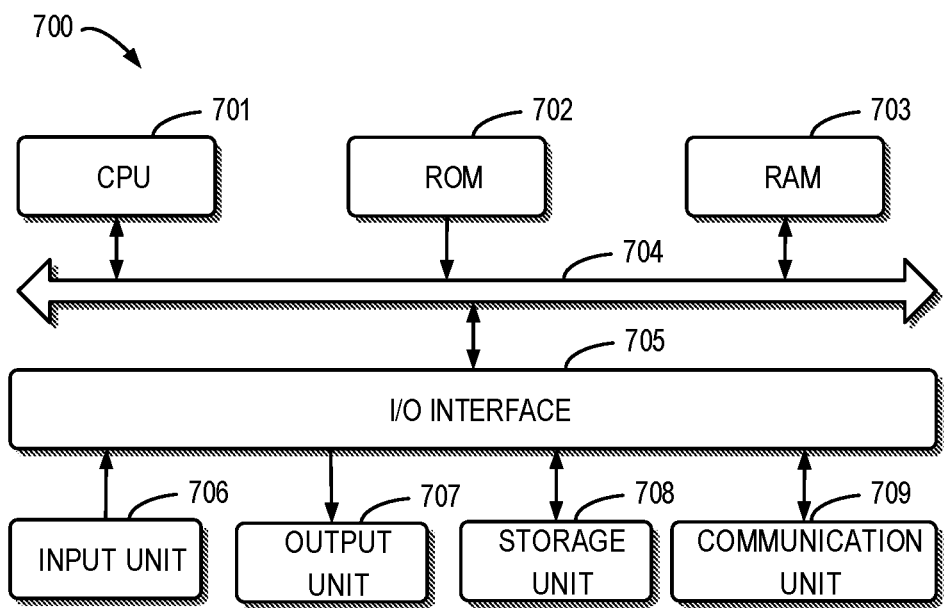
FIG. 7 illustrates a schematic block diagram of an example device that can be used to implement embodiments of the present disclosure.

FIG. 7 illustrates a schematic block diagram of an example device 700 for implementing embodiments of the present disclosure. For example, the SP 120 shown in FIG. 1 can be implemented by the device 700. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk, optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as method 300, 400, 500 and/or 600, can be executed by the processing unit 701. For example, in some embodiments, the method 300, 400, 500 and/or 600 can be implemented as computer software programs tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more actions in the above described method 300, 400, 500 and/or 600 can be implemented.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only provided by example rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

We claim:

1. A method for managing a storage system, comprising:
in response to receiving an Input/Output (I/O) request for a first slice of a logic storage unit in a storage system, obtaining a first bitmap with respect to the logic storage unit, the logic storage unit being divided into a plurality of slices including the first slice, and one bit in the first bitmap indicating whether a cache function is enabled for a respective one of the plurality of slices;
determining, based on the first bitmap, whether the cache function is enabled for the first slice; and
in response to determining that the cache function is enabled for the first slice, processing the I/O request at least with a cache in the storage system;
wherein the cache comprises a plurality of cache pages, and wherein processing the I/O request at least with the cache comprises:
obtaining a second bitmap with respect to the logic storage unit, one bit in the second bitmap indicating whether one of the plurality of cache pages corresponding to a respective one of the plurality of slices is valid or not;
determining, based on the second bitmap, whether a first cache page in the plurality of cache pages corresponding to the first slice is valid or not; and
in response to determining that the first cache page is invalid, forwarding the I/O request to the logic storage unit for processing.

2. The method of claim 1, further comprising:
in response to determining that the cache function is disabled for a different slice, forwarding an I/O request for the different slice to the logic storage unit for processing.

3. The method of claim 1, wherein processing the I/O request at least with the cache comprises:
in response to determining that the first cache page is valid, increasing a reference count for the first cache page; and in response to the reference count exceeding a predetermined threshold, caching a first data associated with the I/O request in the first cache page.

4. The method of claim 3, wherein caching the first data in the first cache page comprises:
obtaining a third bitmap with respect to the logic storage unit, one bit in the third bitmap indicating whether data cached in the cache for a respective one of the plurality of slices is dirty or not;
setting the third bitmap to indicate that data associated with the first slice is dirty; and
caching the first data in the first cache page.

5. The method of claim 4, further comprising:
determining, based on the third bitmap, whether a second data cached in the cache for a second slice in the plurality of slices is dirty data;
in response to determining that the second data is dirty, flushing the second data into the second slice; and
setting the third bitmap to indicate that data associated with the second slice is clean.

6. The method of claim 1, further comprising:
in response to receiving a first command to enable the cache function for a third slice in the plurality of slices, setting a first bit in the first bitmap corresponding to the third slice to enable the cache function for the third slice.

7. The method of claim 1, further comprising:
in response to receiving a second command to disable the cache function for a fourth slice in the plurality of slices, setting a second bit in the first bitmap corresponding to the fourth slice to disable the cache function for the fourth slice.

8. The method of claim 1, further comprising:
in response to receiving a third command to invalidate a second cache page corresponding to a fifth slice in the plurality of slices, setting a third bit in the second bitmap corresponding to the fifth slice to invalidate the second cache page.

9. The method of claim 1, further comprising:
in response to the I/O request, storing data in the first cache page in the plurality of cache pages corresponding to the first slice,
after the data is stored in the first cache page, determining that the cache function for the first slice has become disabled, and
in response to determining that cache function for the first slice has become disabled, releasing the data in first cache page.

10. A device for managing a storage system, comprising:
at least one processing unit;
at least one memory coupled to the at least one processing unit and storing instructions for execution by the at least one processing unit, the instructions, when executed by the at least one processing unit, causing the device to perform actions comprising:
in response to receiving an Input/Output (I/O) request for a first slice of a logic storage unit in a storage system, obtaining a first bitmap with respect to the logic storage unit, the logic storage unit being divided into a plurality of slices including the first slice, and one bit in the first bitmap indicating whether a cache function is enabled for a respective one of the plurality of slices;
determining, based on the first bitmap, whether the cache function is enabled for the first slice; and
in response to determining that the cache function is enabled for the first slice, processing the I/O request at least with a cache in the storage system;
wherein the cache comprises a plurality of cache pages, and wherein processing the I/O request at least with the cache comprises:
obtaining a second bitmap with respect to the logic storage unit, one bit in the second bitmap indicating whether one of the plurality of cache pages corresponding to a respective one of the plurality of slices is valid or not;
determining, based on the second bitmap, whether a first cache page in the plurality of cache pages corresponding to the first slice is valid or not; and
in response to determining that the first cache page is invalid, forwarding the I/O request to the logic storage unit for processing.

11. The device of claim 10, wherein the actions further comprise:
in response to determining that the cache function is disabled for a different slice, forwarding an I/O request for the different slice to the logic storage unit for processing.

12. The device of claim 10, wherein processing the I/O request at least with the cache comprises:
in response to determining that the first cache page is valid, increasing a reference count for the first cache page; and
in response to the reference count exceeding a predetermined threshold, caching a first data associated with the I/O request in the first cache page.

13. The device of claim 12, wherein caching the first data in the first cache page comprises:
obtaining a third bitmap with respect to the logic storage unit, one bit in the third bitmap indicating whether data cached in the cache for a respective one of the plurality of slices is dirty or not;
setting the third bitmap to indicate that data associated with the first slice is dirty; and
caching the first data in the first cache page.

14. The device of claim 13, wherein the actions further comprise:
determining, based on the third bitmap, whether a second data cached in the cache for a second slice in the plurality of slices is dirty data;
in response to determining that the second data is dirty, flushing the second data into the second slice; and
setting the third bitmap to indicate that data associated with the second slice is clean.

15. The device of claim 10, wherein the actions further comprise:
in response to receiving a first command to enable the cache function for a third slice in the plurality of slices, setting a first bit in the first bitmap corresponding to the third slice to enable the cache function for the third slice.

16. The device of claim 10, wherein the actions further comprise:
in response to receiving a second command to disable the cache function for a fourth slice in the plurality of slices, setting a second bit in the first bitmap corresponding to the fourth slice to disable the cache function for the fourth slice.

17. The device of claim 10, wherein the actions further comprise:
in response to receiving a third command to invalidate a second cache page corresponding to a fifth slice in the plurality of slices, setting a third bit in the second bitmap corresponding to the fifth slice to invalidate the second cache page.

18. The device of claim 10, wherein the actions further comprise:
   in response to the I/O request, storing data in the first cache page in the plurality of cache pages corresponding to the first slice,
   after the data is stored in the first cache page, determining that the cache function for the first slice has become disabled, and
   in response to determining that cache function for the first slice has become disabled, releasing the data in first cache page.

19. A computer program product having a non-transitory computer readable medium which stores a set of instructions to manage a storage system; the set of instructions, when carried out by a device, causing the device to perform a method of:
   in response to receiving an Input/Output (I/O) request for a first slice of a logic storage unit in the storage system, obtaining a first bitmap with respect to the logic storage unit, the logic storage unit being divided into a plurality of slices including the first slice, and one bit in the first bitmap indicating whether a cache function is enabled for a respective one of the plurality of slices;
   determining, based on the first bitmap, whether the cache function is enabled for the first slice; and
   in response to determining that the cache function is enabled for the first slice, processing the I/O request at least with a cache in the storage system;
wherein the cache comprises a plurality of cache pages, and wherein processing the I/O request at least with the cache comprises:
   obtaining a second bitmap with respect to the logic storage unit, one bit in the second bitmap indicating whether one of the plurality of cache pages corresponding to a respective one of the plurality of slices is valid or not;
   determining, based on the second bitmap, whether a first cache page in the plurality of cache pages corresponding to the first slice is valid or not; and
   in response to determining that the first cache page is invalid, forwarding the I/O request to the logic storage unit for processing.

20. The computer program product of claim 19, wherein the method further includes:
   in response to the I/O request, storing data in the first cache page in the plurality of cache pages corresponding to the first slice,
   after the data is stored in the first cache page, determining that the cache function for the first slice has become disabled, and
   in response to determining that cache function for the first slice has become disabled, releasing the data in first cache page.

* * * * *